United States Patent
Stager et al.

(10) Patent No.: US 11,445,467 B2
(45) Date of Patent: Sep. 13, 2022

(54) LOCATION IN A DISTRIBUTED LOCATION PROCESSING ARCHITECTURE WITH ROAMING

(71) Applicant: Cisco Technology, Inc., San Jose, CA (US)

(72) Inventors: Paul J. Stager, Akron, OH (US); Matthew Aaron Silverman, Shaker Heights, OH (US); Mukul Chandail, North Royalton, OH (US); Manoj Gupta, Karnataka (IN); Swapnil Devendrakumar Shah, Karnataka (IN); Vishal Satyendra Desai, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/167,979

(22) Filed: Feb. 4, 2021

(65) Prior Publication Data
US 2022/0248364 A1    Aug. 4, 2022

(51) Int. Cl.
*H04W 64/00* (2009.01)
*H04W 4/029* (2018.01)
*H04W 8/00* (2009.01)
*H04B 17/318* (2015.01)
*H04W 48/16* (2009.01)
*H04L 101/622* (2022.01)
*H04W 84/12* (2009.01)

(52) U.S. Cl.
CPC ........ *H04W 64/003* (2013.01); *H04B 17/318* (2015.01); *H04W 4/029* (2018.02); *H04W 8/005* (2013.01); *H04W 48/16* (2013.01); *H04L 2101/622* (2022.05); *H04W 84/12* (2013.01)

(58) Field of Classification Search
None
See application file for complete search history.

(56) References Cited

U.S. PATENT DOCUMENTS

| | | |
|---|---|---|
| 9,179,249 B2 | 11/2015 | Ding |
| 10,764,900 B1 | 9/2020 | Gopalakrishnan et al. |
| 10,785,711 B2 | 9/2020 | Abraham et al. |
| 2015/0094085 A1* | 4/2015 | Agrawal ................ E01H 5/06 455/456.1 |
| 2018/0295673 A1* | 10/2018 | Edge .................. H04W 88/08 |
| 2020/0326405 A1 | 10/2020 | Silverman et al. |
| 2021/0136149 A1* | 5/2021 | Harel ................. G06F 16/9014 |

OTHER PUBLICATIONS

Cisco, "The Cisco CMX Detect and Locate Service", Nov. 5, 2020.
International Search Report and Written Opinion issued in International Patent Application PCT/US2022/015117 dated May 12, 2022 (13 pages).

* cited by examiner

*Primary Examiner* — Adolf Dsouza
(74) *Attorney, Agent, or Firm* — Merchant & Gould P.C.

(57) ABSTRACT

A method and system for providing location services at a network edge is described. An AP can receive location information associated with a second AP in a location group. The AP can also receive client location data from the second AP and associated with a first client. From at least the received client location data, the AP can determine a location of the first client. The AP can then send the location of the first client to a location service.

19 Claims, 10 Drawing Sheets ns/0.js/2/5/0/4/0/2/LOCATION IN A DISTRIBUTED LOCATION PROCESSING ARCHITECTURE WITH ROAMING

TECHNICAL FIELD

The present disclosure relates generally to wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Wireless networks can provide services that are dependent on the location of a user. For example, streaming information, about artwork, to a user based on that user's position in a museum.

Unfortunately, trying to determine a user's position continually in a location can be bandwidth intensive. A location service, which may be remotely located, often receives information about the user's device, e.g. Angle of Arrival (AoA), Time of Flight (ToF), etc. The various APs at the location can separately provide this information about each client to the location service. There is a need to find and deploy location solutions that possibly distribute the processing and lower central processing requirements and reduce WAN traffic.

BRIEF DESCRIPTION OF THE FIGURES

The accompanying drawings, which are incorporated in and constitute a part of this disclosure, illustrate various example of the present disclosure. In the drawings.

DETAILED DESCRIPTION

Overview

Figure 1:
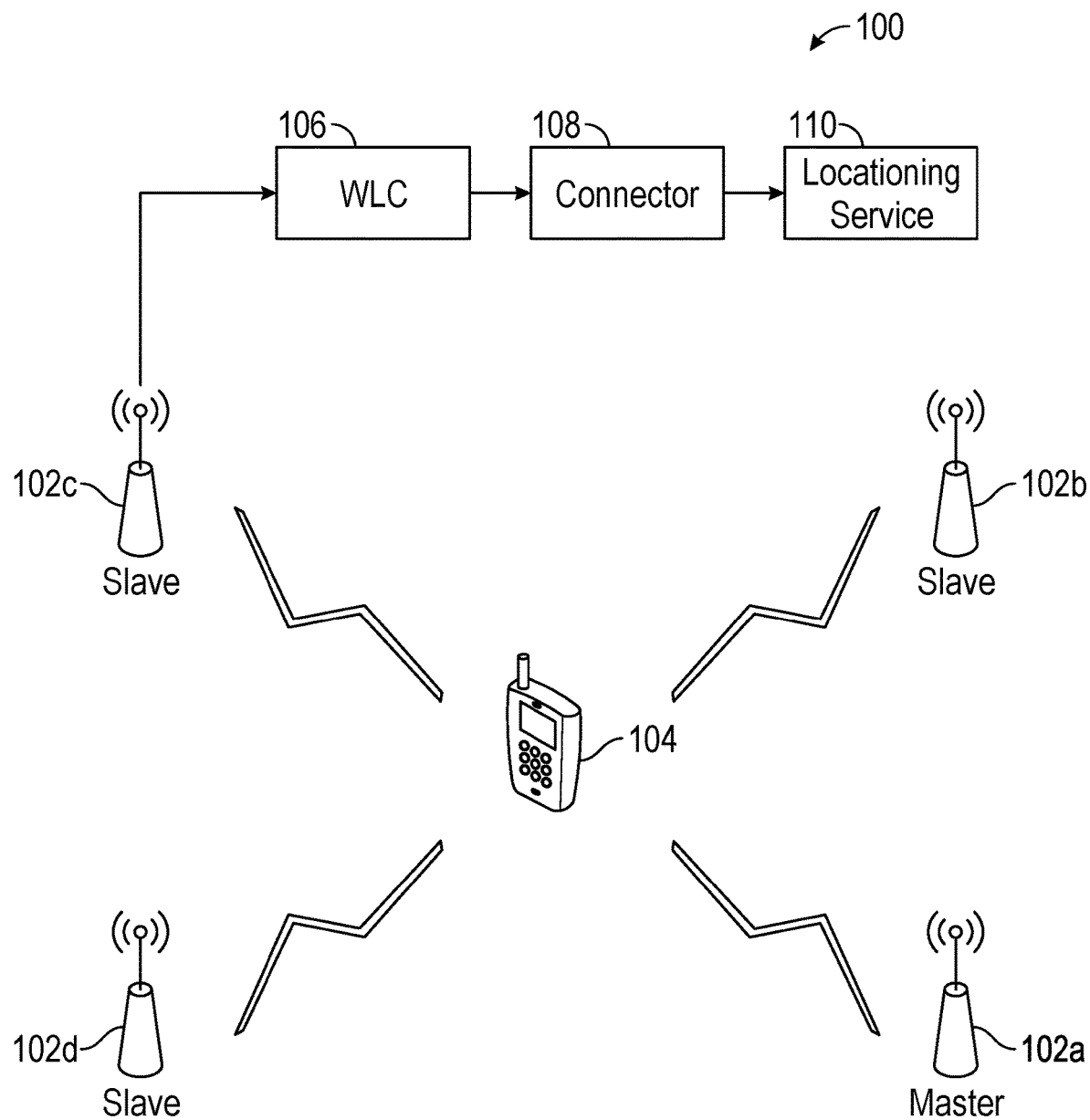
FIG. 1 is a block diagram of wireless network environment in accordance with aspects of the present disclosure.

An optimal method for providing location services at a network edge is described herein. An AP can receive location information associated with a second AP in a location group. The AP can also receive client location data from the second AP and associated with a first client. From at least the received client location data, the AP can determine a location of the first client. The AP can then send the location of the first client to a location service.

Both the foregoing overview and the following description are examples and explanatory only, and should not be considered to restrict the disclosure's scope, as described and claimed. Furthermore, features and/or variations may be provided in addition to those described. For example, examples of the disclosure may be directed to various feature combinations and sub-combinations described in the implementations.

Example

The following detailed description refers to the accompanying drawings. Wherever possible, the same reference numbers are used in the drawings and the following description to refer to the same or similar elements. While example (s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Aspects of the present application move the location determination to the cell edge. Location estimations can be more accurate when the device that is being tracked is in the "convex hull" of the APs/sensors that are used to locate the device. Therefore, when a device moves from one area to another, the APs that are used to track the device can be shifted or changed to avoid degradation in performance.

Location determinations can be divided into groups of two or more APs that can scan to the same channel at approximately the same time to observe location exchanges. Each AP may have a location group, referred to as a L1 group, which includes at least two APs that can have their monitor radios scan to that APs' service channel(s) at the same time. The L1 Group can then share data across the group on the service channel(s). This information can include one or more of, but is not limited to, timestamps, Received Signal Strength Indicator (RSSI), AoA, ToF, and/or other data relevant to locationing.

At least one AP, but in some implementations, each AP, can be sent L1 group information from a server, possibly in the cloud, for example, Dynamic Network Authentication System (DNAS), or an on-premises server, for example, Connected Mobile Experiences (CMX), offered by Cisco. The L1 group information can include one or more of, but is not limited to, the APs' XYZ locations of the APs' antennas, information about relevant exclusion zones, and/or information about obstacles. The APs can then use that information, from DNAS or CMX for example, to calculate an expected location WiFi Heat Map for the AP and the other APs in the L1 group, for example, for RSSI, AoA, ToF, etc., across a map surrounding the AP and the other APs in the L1 group.

By using the collected measurements, received from the other APs and from the AP's own measurements and the expected Heat Maps, each AP can calculate the location of the clients, associated with the AP, and may send the XY location results for display/analytics to the other APs and/or a location service, e.g., in DNA Spaces, offered by Cisco. The master AP can send the XY solution to a location or other server, e.g., DNAS or CMX, for display or analytics The APs in the location group can share, store, and retrieve information about the location of the clients and other relevant information in a Distributed Hash Table (DHT). The DHT can store and provide access to information pertaining to a localized neighborhood. The DHT can offer easy access of shared data across the APs and provides resiliency, with N+1 redundancy, by storing the DHT in multiple locations. Another table, e.g., the Radio Resource Management (RRM)_Client_Probe_Access_Pattern_Table, (referred to as the "RRM Table") can include information about the probing behavior of client STAtions (STAs) from the infrastructure (e.g., radio) perspective. This RRM Table may include details about one or more of, but not limited to, the probe RSSI per radio, the channels (e.g., a list of frequencies where a probe was received), successive probe frequencies, a last heard timestamp, and/or a previously connected AP, for example, in the last 3600 seconds. The aforementioned information can be embedded within the RRM table and can influence master AP selection. The RRM Table can be further expanded to append details from the monitor radios. Similarly, a 2.4 GHz probing pattern can help determine master AP selection for Bluetooth Low Energy (BLE) stations.

The master AP can be determined for stations in following states, including one or more of, but not limited to, associated STAs, unassociated STAs, and/or roaming. For associated STAs, a master AP can be a device where the station is currently associated. Furthermore, a client STA's association history or movement pattern can influence master AP selection. For example, any STA at the cell edge can benefit from having a master AP candidate as the closest neighbor (with potentially better signal reception) where the STA is mostly likely to associate in the near future. For moving STAs with known access patterns, a preemptive computation, on the master AP list, can be conducted to determine a future location and AP association.

For unassociated STAs, the master AP can be based on a Media Access Control (MAC) address of the STA within each L1 group. The distribution of MAC addresses, across APs in the L1 group, can be predetermined or dynamically updated by an arbiter. In other examples for unassociated STAs, the master AP can be based on the time-filtered RSSI of the STA, to each AP per L1 group. For example, the STA's probe RSSI readings, from RRM Table, can be inspected to determine a list of radios where the STA's probes are heard with a relatively stronger signal (for example, greater than or equal to −65 dBm). Combining the probe signal strength with one or more of, but not limited to, present load (for example, calculated from the receive load, RxUtiln and the transmit load, TxUtil), Computer Processing Unit (CPU) load, and/or Wi-Fi contention observed on the frequencies in the L1 list can influence a best candidate for master AP node.

Turning now to states where a STA is roaming, an unassociated client (e.g., a WiFi or BLE client) locationing can be determined by an arbiter node from location calculations provided by multiple potential location groups. In implementations, several location groups can send XY location estimates and, possibly, metadata to the arbiter node. The arbiter node can analyze the location and metadata to finalize the location estimate and send that location estimate to the location service, e.g., the DNAS server.

The arbiter node can select the final location solution based on, for example, the metadata and/or a historical location solution. Example metadata can include one or more of, but is not limited to the RSSI, any location solution variance, speed, a solution confidence error, etc. As device roams from one L1 group to another, the location result may be taken from the location group that has the best chance of getting a good estimate.

When an associated client is roaming, the L1 groups can formed per previous methods. For fast roaming, the location solution may be calculated at the AP of association (e.g., the master AP), which collects the RSSI, AoA, Fine Timing Measurement (FTM) data from APs in the AP's L1 group over distributed shared. The master AP can then trigger a roaming event to another AP in the L1 group when the master AP writes Kalman filter states to distributed memory and the other AP retrieves the filter states when a new master AP takes over.

Implementations of a wireless environment 100 may be as shown in FIG. 1. The wireless environment 100 can include one or more of, but not limited to, one or more APs 102, a client device 104, a Wireless Local Area Network (LAN) (WLAN) controller (WLC) 106, a connector 108, a locationing service 110, etc. These one or more systems 102-110 can be wireless devices 630, as described in conjunction with FIG. 6B. Further, the systems 102-110 can also be computing systems 600 as described in conjunction with FIG. 6A.

The wireless environment 100 can include a WLAN, which may be referred to as WLAN 100, network 100, wireless environment 100, etc., and which can include the one or more APs 102. The wireless environment 100 shows just four APs 102, but the wireless environment 100 can include any number of APs 102. The APs 102 can communicate with each other to conduct operations in concert. As shown in FIG. 1, the wireless network 100 may comprise Wi-Fi APs 102 that may be configured to support a wireless (e.g., Wi-Fi) network 100. The APs 102 may comprise a physical location where a user, operating a client 104, may obtain access to a wireless network 100 (e.g., Internet access), using Wi-Fi technology, via a WLAN using a router connected to a service provider.

The environment 100 can include one or more access points (APs) 102a, 102b, 102c, 102d. The APs 102 may provide wireless access to the devices 104. Each access AP 102 may communicate with the various devices 104 to provide wireless service to the client 104 and to determine a location of the client. As such, the APs 102 may provide wireless access to two or more users using different devices. Further, the APs 102a-102d may communicate with each other through a wired or wireless connection.

The wireless environment 100 can also include a WLC 106, which may also be referred to simply as the controller 106. The controller 106 may control actions of the APs 102. As such, the WLC 106 may be in communication with APs 102a-102d. Further, the WLC 106 may also function as an intermediary system between the APs 102 and a connector 108. The WLC 106 is shown as a single server, in FIG. 1, but may represent multiple different computing devices either physically located near the APs 102, or physically separate and accessed through one or more networks, for example, the Internet or a cloud.

The APs 102 may be in communication with one or more clients 104, which may also be referred to simply as devices 104 or client devices 104. The clients 104 may be physically dispersed through a physical area covered by APs 102 of the WLAN 100. The clients 104 and the APs 102 may be wireless devices, as described in conjunction with FIG. 6B and may be computing systems, as described in conjunction with FIG. 6A.

In another example(s) of the disclosure, rather than APs 102, devices may be used that may be connected to a cellular network that may communicate directly and wirelessly with end use devices (e.g., a client 104 device) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, example of the disclosure may use wireless communication protocols using, for example, Wi-Fi technologies, cellular networks, or any other type of wireless communications.

Client devices 104 may comprise, but are not limited to, a phone, a smartphone, a digital camera, a tablet device, a laptop computer, a personal computer, a mobile device, a sensor, an Internet-of-Things (IoTs) device, a cellular base STA, a telephone, a remote control device, a set-top box, a digital video recorder, a cable modem, a network computer, a mainframe, a router, or any other similar microcomputer-based device capable of accessing and using a Wi-Fi network or a cellular network.

The connector 108 can be a device or a virtual device/application executed in a computing device, for example, device 600. The connector 108 can connect through a web socket or other connection 222 to a location service 110. Connector 108 can send information to and receive information from the location service 110, in a format and a protocol readable/writable by the location service. Further, connector 108 can receive information from location service 110 to forward on to the WLC 106 or to the one or more APs 102. Connector 108 may also receive various connections from the APs 102 or the WLC 106. These connections can provide or send data as required. Thus, the connector 108, functions as an intermediary device to communicate to and from the location service 110 to the different devices in the wireless LAN 100.

Location service 110 can be any type of device or service that provides locationing data, location estimates, or other location information. In implementations, locationing service 110 can be the Cisco DNA Spaces application. The location service 110 can store locations for one or more clients 104 in connection with an AP 102. In implementations, the location service 110 may also store information about the APs including one or more of, but not limited to, for example, the X,Y location of the AP 102, the signaling and other types of data for the antennas, information about exclusion zones, information about obstacles, etc. This information may be provided by location service 110 to the one or more the APs 102. Further, the DNA Spaces or location service 110 can accept the client locations to store in a database or data store. Further, the DNA Spaces 110 or location service 110 can model client movement to provide predicted movement and other types of information if necessary.

The elements described above of the wireless network 100 (e.g., WLC 106, AP 102, client devices 104, connector 108, location service 110, etc.) may be practiced in hardware, in software (including firmware, resident software, micro-code, etc.), in a combination of hardware and software, or in any other circuits or systems. The elements of wireless network 100 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIGS. 6A and 6B, the elements of wireless network 100 may be practiced in a computing device 600 and/or wireless device 630.

Figure 2:
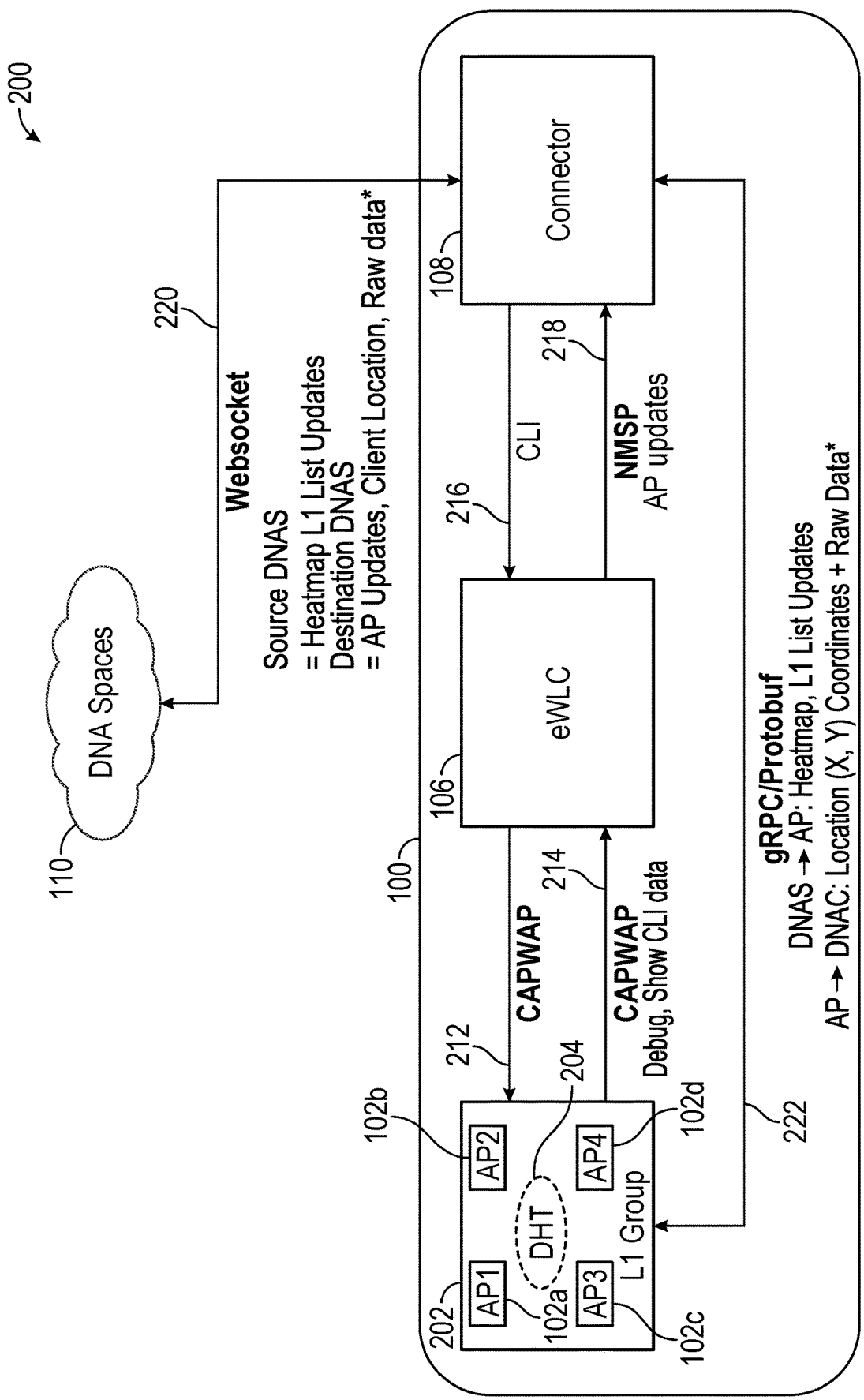
FIG. 2 is another block diagram of wireless network environment in accordance with aspects of the present disclosure.

Another implementation of wireless environment 200 may be as shown in FIG. 2. Here, the wireless environment 200 includes the one or more APs 102 that are formed into a group 202. Group 202 can be a location group. Location group 202 can function to determine the location of a client device 104 that may be in contact with one or more the APs 102 in the group 202. The device 104 may share information in a distributed hash table (DHT) 204 that stores the location information or other types of data for the AP location group 202. The DHT 204 may be stored in the memory of one or more the APs 102, or in another location physically separated from the APs 102 but accessible by those devices 102.

Location group 202, and the APs 102 therein can be in communication with the WLC 106. In implementations, the APs 102 communicate through a Control And Provisioning Wireless Access Points (CAPWAP) connection. The CAPWAP data can be sent to the WLC 106 through CAPWAP Uplink 214, while the downlink data, e.g., location database information, can be sent to the APs may be sent through CAPWAP Downlink 212. These different communications can include location data or other types of data used to locate the client 104 for the group 202.

The WLC 106 may be in communication with the connector 108. The WLC 106 may send data to the connector 108 through a network Management Statistics Process (MSP) 218 connection, which provides updates about the APs 102 received by the WLC 16 to the connector 108 through connection 218. These updates can be forwarded to the location service 110. Likewise, the connector 108 can send data to the WLC 106 through a Command Line Interface (CLI) 216. The CLI 216 allows the connector 108 to send data from the location service 110 to the WLC 106 and then on to the APs 102, as necessary.

Connector 108 may be the same or similar as the connector 108, as described in conjunction FIG. 1. As such, the connector 108, of FIG. 2, will not be explained further here. The connector 108 may be in communication with one or more the APs 102, in the group 202, through a Remote Procedure Call (RPC) connection 222. The RPC connection 222 may allow the connector 108 to provide the heat maps and any type of group list updates, client updates, etc., to the APs 102. Further, the APs 102 may upload location coordinates and log data about one or more clients 104 through the RPC connection 222, to the connector 108. The connector 108 can send this information to and receive information from the location service 110.

Location service 110 can include, for example, a virtual application or cloud service, for example, DNA spaces. There may be a websocket cloud connection 220 through the connector 108 to the location service 110. The location service 110 can send the heat map for the L1 group, L1 group list updates, or destination information to the APs 102. Further, the location service 110 can receive AP updates, client locations, and raw data from the APs 102 to the location service 110 through the connector 108.

In implementations, the APs 102 may have a master and slave relationship for locationing data. Thus, one AP, for example, AP 102a, may be considered a master AP, for one or more client devices 104. The other APs 102b-102d, within the location group 202, may be considered slave devices 102. In these instances, the master AP 102a can determine the location of the device 104 from both data received at the AP 102a and also from data received from the one or more slave APs 102b-102d. To determine information about the client location, the master AP 102a, along with the other APs 102, may scan a service channel for the APs 102 within the location group 202. The service channel can provide location information, for example, client signal characteristics (e.g., RSSI, AoA, ToF, channel information, etc.) about the client 104 from the other APs 102. The master AP 102a may use this information to compare and derive the location in a heat map calculated for the group 202. The master AP 102a may send the location information or other data from the group 202 to the WLC 106 or the connector 108 to send to the location service 110. For each device within the network 100, a particular device 104 can have a particular master AP 102a. However, some devices 104 may have different master APs 102b-102d. Thus, different devices 104 may have different masters as each AP 102 may function as a master AP for some set or subset of devices 104 within the LAN 100.

Figure 3A:
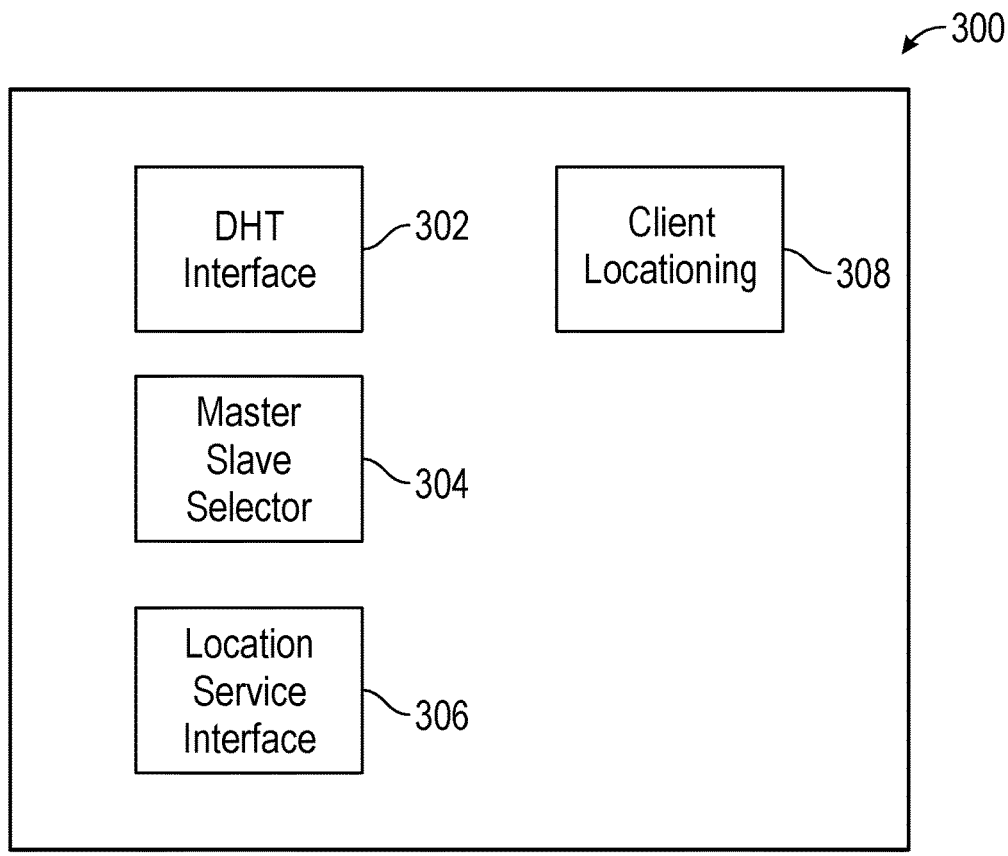
FIG. 3A is a block diagram of device components in accordance with aspects of the present disclosure.
Figure 6A:
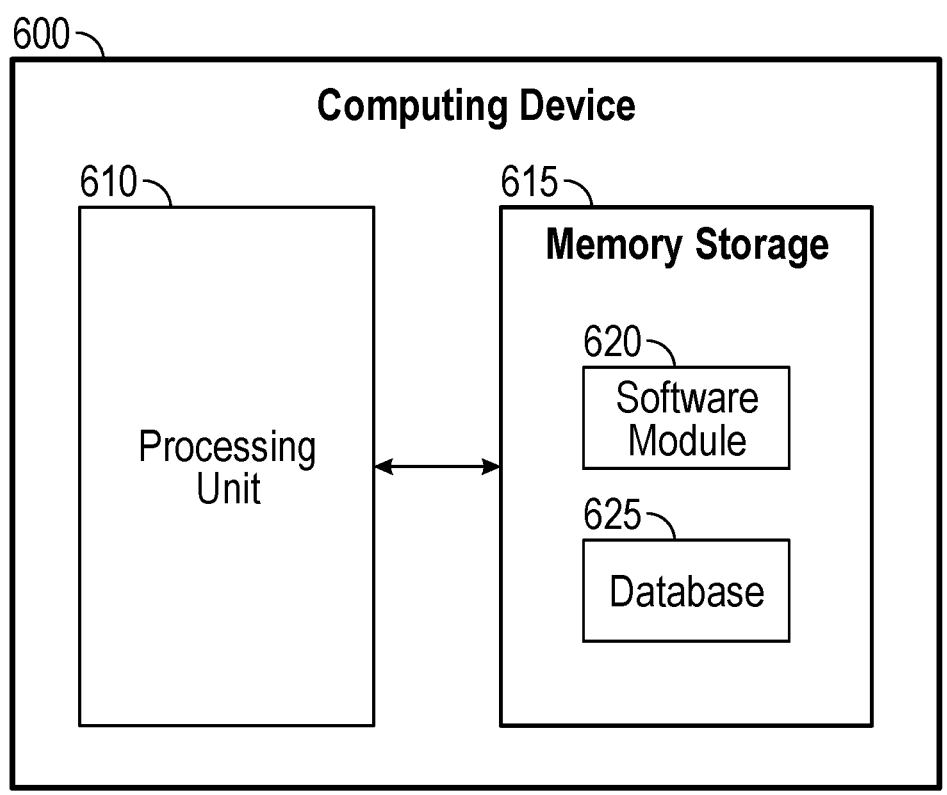
FIG. 6A is a block diagram of a computing device in accordance with aspects of the present disclosure.

An implementation of components 300, associated with any of the one or more devices, systems, servers, etc. 102-110, for conducting operations contained herein may be as shown in FIG. 3A. The components 300 may be part of or executed as part of the computing system 600 as is shown in FIG. 6A. These components can be hardware, software, hardware and/or software that is included in one or more of the devices 102, 104, 106, 108, and/or 110. The components 300 can include one or more of a distributed hash table interface 302, a master slave selector 304, a location service interface 306, and/or a client locationing component 308.

The DHT interface 302 may be operable to conduct the store and/or retrieve operations with the DHT. As explained previously, the DHT may be stored either locally in the AP 102a or another AP 102b-102d, within the group 202, or may be stored at some other shared memory location. The DHT interface 302 is operable to connect with the memory storing the DHT, save changes or new data to the DHT, and/or retrieve data from the DHT. Thus, the DHT interface 302 can form or compose any messages or communications necessary to affect the storing or retrieval of DHT data.

Master slave selector 304 is operable to determine, through various processes and/or with various data, which AP 102 is assigned as a master AP 102a, for client 104, and what APs 102b-102d will not function as a master AP for the client 104. The master slave selector 304 can execute various methods as described hereinafter in conjunction with FIGS. 5A-5C. The master slave selector 304 may also be operable to store a designation of which AP 102 is the master AP 102a in the DHT. Thus, the master slave selector 304 may send this master designation information to the DHT interface 302 to be stored in the DHT.

Locationing service interface 306 can interface with the location service 110 or with the connector 108 that may function to communicate with the location service 110. As such, locationing service interface 306 can compose messages for either retrieving location information, for example, the heat map, or for receiving or sending location information, such as a client location to or from the location service 110.

Client locationing component 308 may conduct any operation to determine a location or a location estimation of the client 104 within the wireless LAN 100. A location estimation is an approximation of the location of the client device 104 within some predetermined margin of error, e.g., two (2) meters, 15 centimeters. etc. Thus, client locationing component 308 can receive signal characteristics, for example, the RSSI, ToF, AoA, or other types of information about signals being sent to and/or received from the client 104. Location information, including other information from other APs 102b-102d can be used to triangulate a position of the client 104 and store that information in the DHT. Thus, client locationing component 308 can send location information to the DHT interface 302 to be stored in the DHT and to the location service interface 306 to be sent to the location service 110.

Figure 3B:
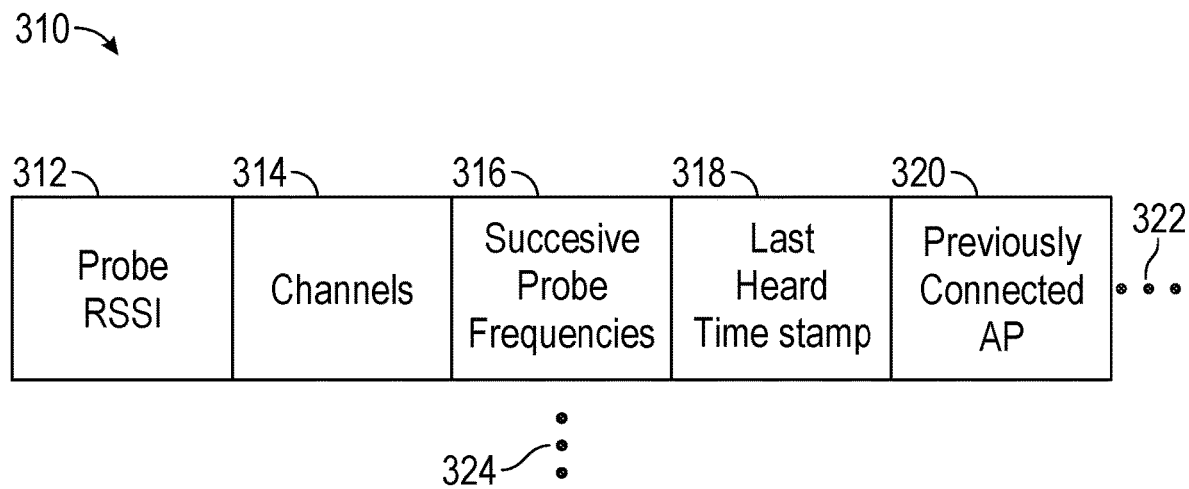
FIG. 3B is a block diagram of a data structure in accordance with aspects of the present disclosure.

An implementation of at least some of the data that may be stored in a DHT 310 may be as shown in FIG. 3B. The data structure 310 can have one or more fields, as shown in FIG. 3B, but there may be fewer or additional fields presented in each data structure 310, as represented by ellipses 322. Further, for each client 104 within the environment 100, the client 104 can have a different data structure 310. Thus, there may be more or fewer data structures 310, in a memory storing the DHT information, as represented by ellipses 324. The data structure 310 can include one or more of, but is not limited to, a probe RSSI 312, channels 314, successive probe frequencies 316, a last heard time stamp 318, and/or a previously connected AP 320.

The probe RSSI 312 can be any received probe signals received by radios of the current AP 102a, or as received through a service channel from other APs 102b-102d. The probe RSSI information 312 may be associated with the client 104. The probe RSSI 312 can also include other types of signal information, such as the AoA, ToF, timestamps, etc. This data may be received and stored in this part of the DHT 310 to determine a location of the client 104 based on the collection of signal information from many or all APs 102 in communication with the device 104.

The channel 314 data can list the frequencies, channels, subbands, etc., where probes were received from the device 104. Thus, the frequencies can be the 6. GHz, 2.4 GHz, 5 GHz, etc. Channels 314 can also include other channels or subbands within those wider bandwidths. These channels 314 may be listed to determine on which channels the AP(s) 102 may be communicating. The channels 314 can include both the channel from the current AP 102a, as the master AP, and from the slave APs 102b-102d.

The successive probe frequencies 316 can include any probe frequencies that may be used in the future. For example, the probe frequencies 316 can include other radios or channels that have not received probes as listed in field 312, 314. The successive probe frequencies 316 can also list frequencies to be probed by both the master AP 102a and other slave APs 102b-102d, as may be communicated through the service channel of the master AP 102a.

The last heard time stamp 318 can be a time stamp for the last time a probe frequency was heard by the master AP 102a or one of the slave APs 102b-102d. The last heard time stamp 318 can be a date and time. The last heard time stamp 318 may be a time from a 24-hour clock or some other time listing.

The previously connected AP 320 can include which AP 102 that was connected or associated with the device 104. Thus, the previous connected AP 320 may be the master AP 102a for that device 104, as previously determined. However, the device 102 may have been out of contact with that AP 102, and the previous connected AP field 320 can list the IDentifier (ID) of the AP 102 that was associated with the device 104, before the disconnection. The previous connected AP 320 can include any type of identifier for the AP 102, including, but not limited to, a numeric identifier, and alphanumeric identifier, a Globally Unique ID (GUID), an Internet Protocol (IP) address, a MAC address, etc.

Referring now to FIGS. 4A through 5C, the various methods 400, 414, 424, 500, 512, and 520 will be explained hereinafter with reference to the systems or environments 100, 200, the components 300 of FIG. 3A, the data structure 312 of FIG. 3B, etc. The methods 400, 414, 424, 500, 512, and 520 can start with a start operation and can end with an end operation. The methods 400, 414, 424, 500, 512, and 520 can include more or fewer stages or can arrange the order of the stages differently than those shown in FIGS. 4A-5C. The methods 400, 414, 424, 500, 512, and 520 can be executed as a set of computer-executable instructions, executed by a computer system or processing component, and be encoded or stored on a storage medium. Further, the methods 400, 414, 424, 500, 512, and 520 can be executed by a gate or other hardware device or component in an ASIC, a FPGA, a SOC, or other type of hardware device. Hereinafter, the methods 400, 414, 424, 500, 512, and 520 shall be explained with reference to the systems, components, modules, software, signals, data structures, etc. described herein.

Figure 4A:
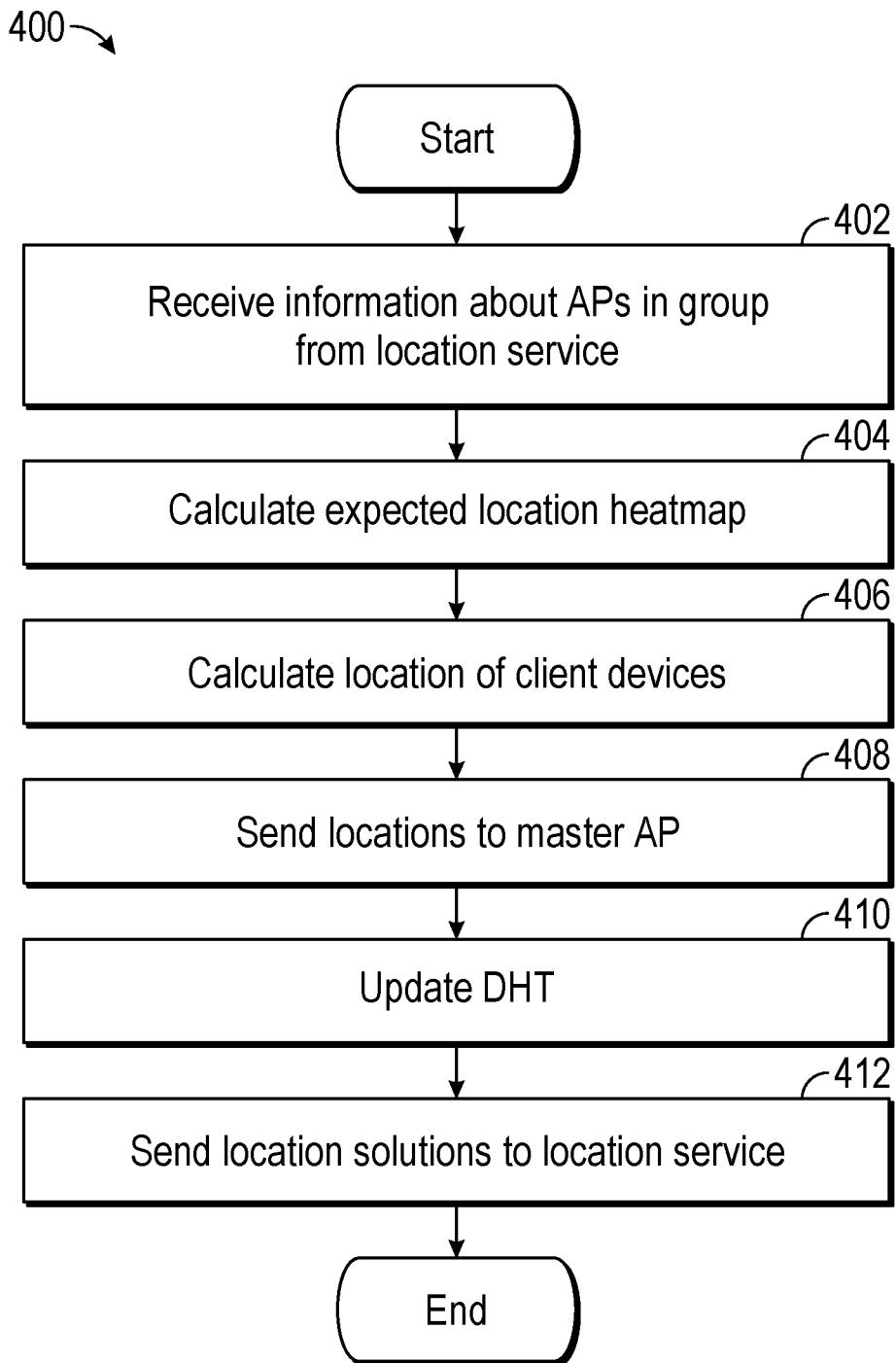
FIG. 4A is a flow chart of a method for determining a location of a client in accordance with aspects of the present disclosure.

A method 400 for determining client locations at a cell edge may be as shown in FIG. 4A. The master AP 102a can receive information about one or more APs 102, in the location group 202, from the location service 110, in stage 402. The information provided to the master AP 102a can include a heat map, a list of APs 102 in the L1 location group 202, the XYZ coordinates of the APs 102 within the group 202, a destination DNAS, other data that may allow the master AP 102a and the other slave APs 102b-102d to calculate client locations based on client signals. In implementations, the master AP 102a can receive one copy of location information while the other slave APs 102b-102d can receive separate copies. The communication of the location information, from the location service 110, can be through a web socket 220 to the connector 108. From there, the connector 108 can send the location information to the WLC 106 through connection 216. The WLC 106 may then communicate the information to the one or more the APs 102a-102d through connection 212. In other implementations, the data may be sent from the connector 108 directly to one or more the APs 102 through the gRPC connection 222. The location service interface 306 of the AP 102 can receive this information from the location service 110.

The master AP 102a can then calculate a location heat map, in stage 404. The heat map can include the locations or estimated locations of the clients 104, within the physical area covered by the LAN 100 serviced by the APs 102a-102d. The heat map can include the locations of the various APs 102. Further, the location heat map can also calculate obstructions or other types of physical characteristics that cause signal weaknesses for one or more APs 102.

Thereinafter, the master AP 102a or the one or more other APs 102b-102d may calculate the location of client devices 104 within the physical area covered by the LAN 100 serviced by the APs 102, in stage 404. Here, the client locationing function 308 can receive RSSI, AoA, ToF, and other data from signals transmitted from the client device 104 to the AP 102. This information may be stored as probe RSSI information, in field 312. From this information, the client locationing function 308 can determine a location based on triangulation of the client 104 within the area service by the LAN 100 based on the locations of the several APs 102a through 102d, in stage 406. In implementations, each AP 102 may determine the location of client 104 in communication with them. This location information may be sent to the master AP 102a. In other implementations, each AP 102 may function as a master AP 102a for a group of clients 104. With those APs 102 that are considered master APs 102a for a set of clients 104, those master APs 102a may calculate the location for those clients 104. One AP, for example, master AP 102a, may receive location data. This location data may be sent by the APs 102, in stage 408, to the master AP 102a for the master AP to save this information in the DHT 310, in stage 410. The master AP 102a can update the DHT 310. The DHT interface 302, of the master AP 102, can write the locations or other data, as described in conjunction with FIG. 3B, to the DHT 310. This DHT 310 can include the location information for clients 104 stored locally for the APs 102.

Thereinafter, the master AP 102a or other APs 102 can send the location solutions to the location service 110, in stage 412. Here, the location service interface 306, of the AP 102, may send the information from the DHT 310 to the DNA spaces or location service 110. The information sent can include any of the raw data, location of the clients 104, and/or any other types of updates about the APs 102 or the clients 104, for example, that the client is roaming, that an AP is out of service, etc. The information may be sent from the APs 102 by the gRPC connection 222 to the connector 108. In other implementations, the APs 102 may send information to a WLC 106 through a CAPWAP connection 214. The WLC 106 may then send the information through an Network Mobility Services Protocol (NMSP) connection 218 to the connector 108. Then, the connector 108 may send the information through the web socket 220 to location service 110.

Figure 4B:
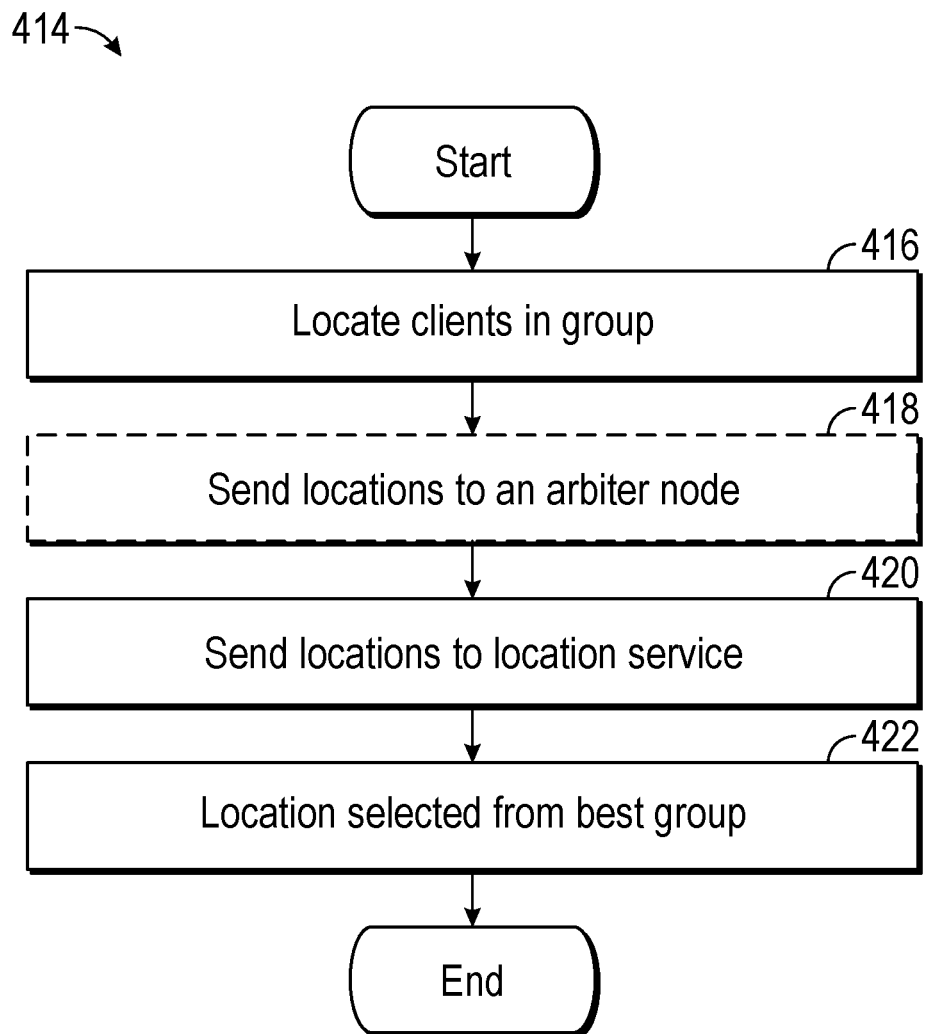
FIG. 4B is another flow chart of a method for determining a location of a client in accordance with aspects of the present disclosure.

Another method 414 for conducting locationing of the clients 104 may be as shown in FIG. 4B. The location group 202 can locate clients in the group 202, in stage 416. Locationing of the clients may be conducted in a similar process to the process 400, as described in conjunction FIG. 4A. The locations may be assigned by the group 202 to the DHT 310. Thereinafter, optionally, the master AP 102a may send the location of one or more clients 104 to an arbiter node, in stage 418. An arbiter node may be a node (e.g., another AP 102) in communication with one or more groups 202. Arbiter nodes may be able to receive location information from one or more clients 104 that may be communicated to by one or more groups 202. The arbiter node can determine which of the locations, provided by two or more groups 202, may be used, based on the information sent to the arbiter node.

In stage 420, the location information may be sent to location service 110. The sending of information to the location service 110 may be as described in conjunction FIG. 4A. The location service 110 can receive location information from two or more groups 202 or from an arbiter node. Thus, one client 104 may be in communication with one or more groups 202 and/or may be roaming between the groups 202.

Location service 110 can then determine which best location is selected from the best group 202, in stage 422. Location service 110, similar to the arbiter node, can review the information sent from the two or more groups 202. Based on that information, for example, information in data structure 310, the location service 110 can select the best location from the best group 202. Thus, the selected location can be the group 202 which, received, from the client 104, the strongest signal, has the most overlapping coverage among APs 102 within a group 202, or which has other characteristics that make that group's selection the best.

Figure 4C:
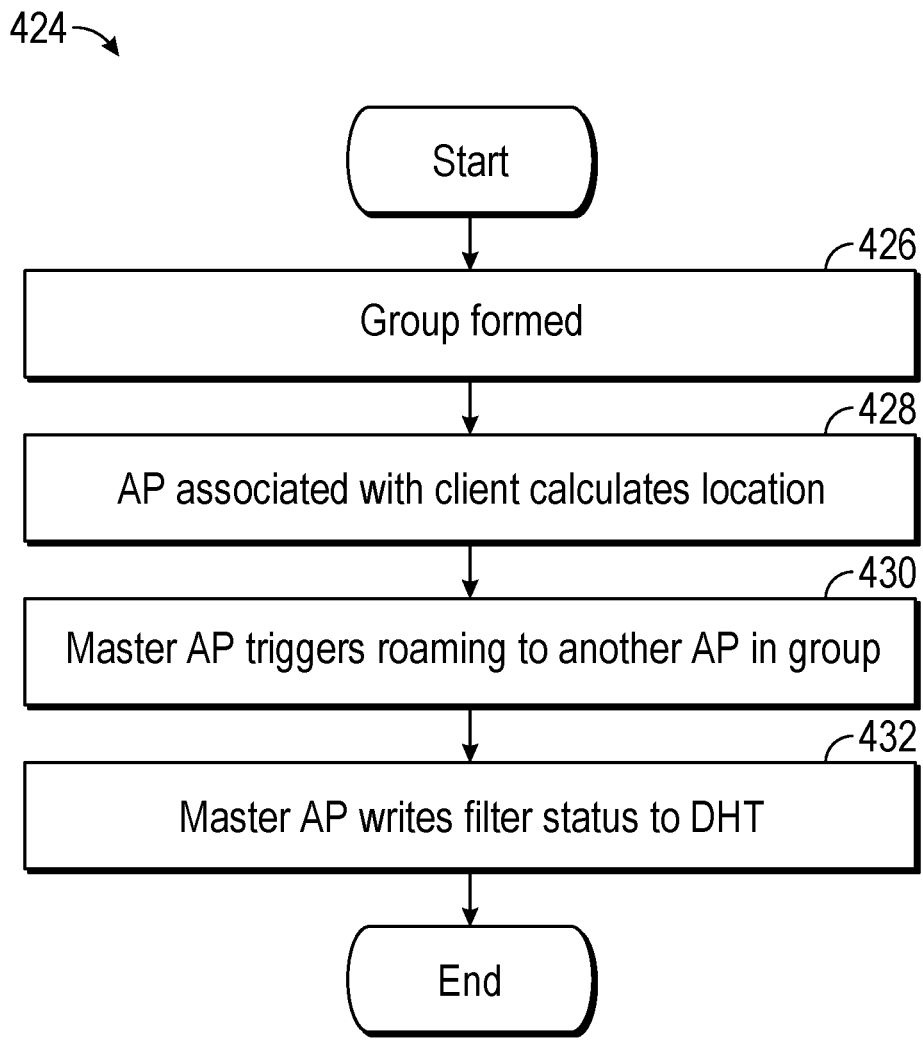
FIG. 4C is another flow chart of a method for determining a location of a client in accordance with aspects of the present disclosure.

Another implementation of a method 424 for conducting or determining location of clients 104 may be as shown in FIG. 4C. The L1 group 202 can be formed in stage 426. Here, the location service 110 may direct the APs 102b-102d to associate as a location group 202. In other implementations, the APs 102b-102d can associate with each other as a group 202. For example, the APs 102 may determine that signal(s) sent from each AP 102 is received by the other APs 102 with a signal strength that indicates a physical proximity to each of the APs 102. Based on this information, the APs 102 may send signals amongst each other in beacons or other types of service connections or service channels to indicate that the APs 102 can associate as a group 202.

One of the APs 102 can be associated with the client 104 to determine the client's location, in stage 428. Here, for example, the master AP 102a can calculate the location of device 104 based on the information data structure 310 and/or from data that is received from the other APs 102b-102d on the AP's service channel. The calculation location may be similar to what was explained in conjunction FIG. 4A.

The master AP 102a, regardless of whether the AP 102a is calculating a location of the client 104, may trigger a roaming indication to another AP 102 and/or another group 202. The master AP 102a can recognize that the client device 104 is on the move out of the coverage area of the group 202. In this way, the master AP 102a can signal another AP 102, in another group 202, or may send a signal to the DNA spaces or location service 110 to indicate that the client 104 is roaming. The information about the client 104 may then be sent to the location service 110 for the other AP 102 to begin tracking and/or locating the client 104.

The master AP 102a can write a filter state to the DHT 310, in stage 432. The master AP 102a may write a Kalman filter state to the DHT 310 to indicate that the client is moving, which direction the client may be moving, which AP 102 may need to be transitioned service of the client 104, and other information. This filter state may also be communicated to the location service 110 or to another AP 102 to facilitate a handshake and handover of the client 104 to another location group 202.

Figure 5A:
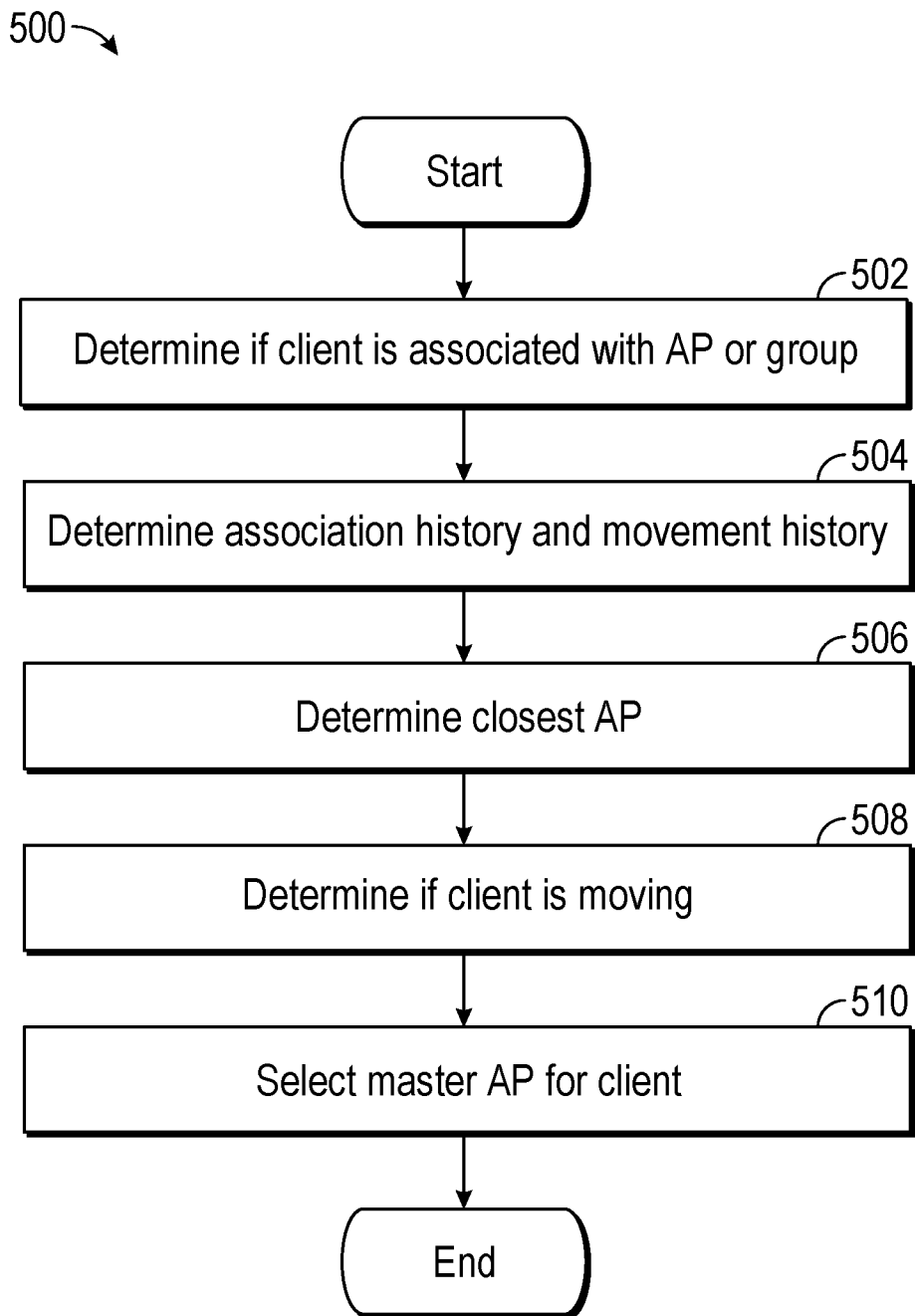
FIG. 5A is a flow chart of a method for determining a master AP in accordance with aspects of the present disclosure.

A method 500 for determining the master AP 102a may be as shown in FIG. 5A. The APs 102 can determine if a client 104 is associated with an AP 102 in the group 202, in stage 502. The master AP 102a or one of the other APs 102 can access the DHT 310, through the DHT interface 302, to determine if the client 104 is listed within the DHT 310. For example, the MAC address or some other identifier for the client 104 may be listed in the DHT 310. If the client 104 is listed within the DHT 310, the client 104 can be determined to be associated with the group 202. Further, and AP identifier, for example, a MAC address, may be used to identify the AP 102 associated with the client 104.

The APs 102 or the location service 110 may determine an association history, movement history, etc. in stage 504. The AP 102 may determine, based on information in the DHT, whether the client 104 was previously associated with an AP 102 in the group 202. For example, the AP 102 may access the previously connected AP information 320 to determine a last or previous AP 102 associated with the client 104. In other implementations, the AP 102 may request an association history from the location service 110. Further, AP 102 may determine movement history, in stage 504. Thus, the AP may store within the DHT 310 or the location service 110 may store and provide movement history. Movement history can be a set of known paths or points visited by the AP 102, either in sequence or in some sort of discernible order in the past. This movement history may allow the master AP 102a or other AP 102 to determine a next predicted location for the client 104. Based on this next location, the AP 102 can then determine a best association with an AP 102, in the group 202, to provide the strongest and best locationing signal.

The APs 102 can then determine the closest AP 102, in stage 506. Here, based on the RSSI or other signal information, the association history, the movement history, or other types of information, the master AP 102a or other AP 102b-102d can determine the closest AP 102 to the client 104. The closest AP 102 is most likely the best to provide location services as the signals are strongest.

The master AP 102a can also determine if the client 104 is moving, in stage 508. If the client's signal changing over time, the master AP 102a can determine if the client is moving. Further, the master AP 102a receives information, based on signal probes from the APs 102, to determine possibly the direction and/or velocity of movement. Based on this movement, the master AP 102a can determine if the client 104 is roaming in the group 202 or from the group 202. Based on this movement, the master AP 102a or the group 202 can determine the client 104 requires a new master AP 102a for that client 104.

Based on the various information above, the group 202 can determine the master AP 102a for that client 104, in stage 510. Thus, the AP 102 that provides the best chance of providing good location information from the client 104 can be selected for the master AP 102a. This selected AP 102 can be the closest to the client 104, the AP 102 that is in the path of the movement or movement history, the AP 102 that has a previous association with the client 104, or otherwise. Based upon this information, the group 202 can vote for the master AP 102a or the master AP 102a can assume responsibility and signal to the other APs 102. The first AP 102 to take control of the association with the client 104 may be the master AP 102a for that client 104.

Figure 5B:
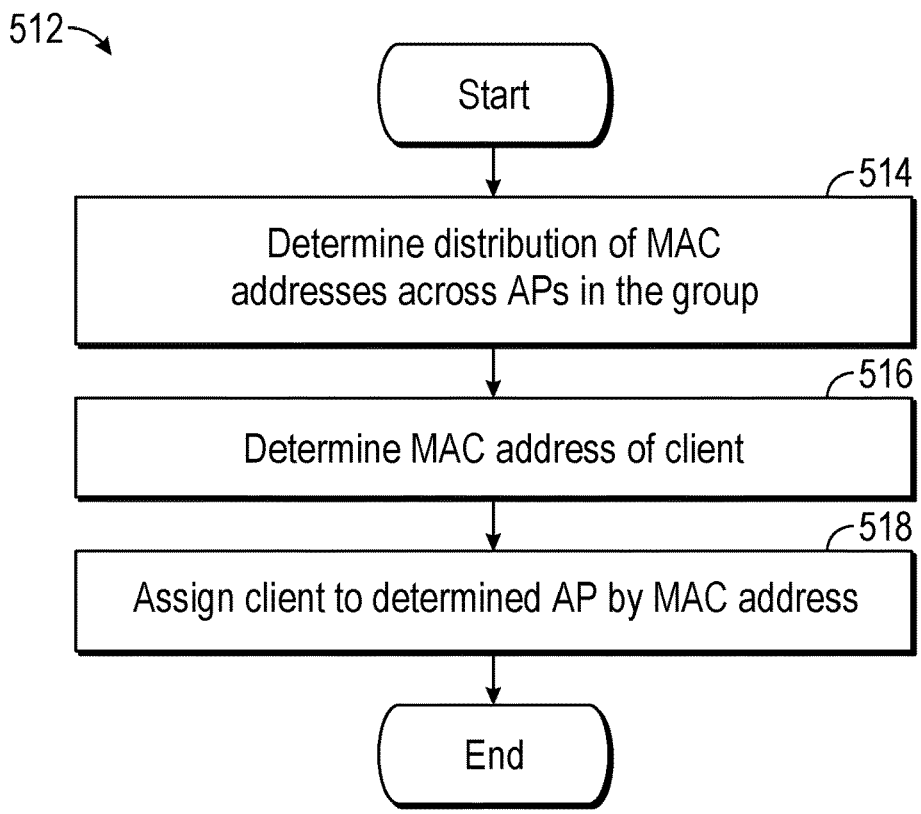
FIG. 5B is another flow chart of a method for determining a master AP in accordance with aspects of the present disclosure.

Referring now to method 512 of FIG. 5B, the method 512 can provide another process for determining the master AP 102a for the client 104 within the group 202. The AP group 202 can determine the distribution of MAC addresses across the APs 102 associated with the group 202, in stage 514. Here, all clients 104 may have an associated MAC address. That MAC address list may compose two or more MAC addresses. The distribution of MAC addresses can be based on an even distribution, such that each AP 102 is associated with approximately the same number of MAC addresses. In other implementations, the distribution of MAC addresses may be based on other information, for example, the load on the AP 102. Regardless, this distribution of MAC addresses may be across APs 102 and may be provided as a listing which is stored in the DHT 310.

The AP 102 can determine the MAC address of the client 104, in stage 516. For example, the AP 102 can provide beacon or other signals that are responded to by the device 104 with a probe signal or other signal that includes the client's MAC address. Once the MAC address is provided, AP 102 can look up the MAC address in the listing of MAC addresses distributed to that AP 102.

The AP 102 may the assign the client 104 to the AP 102 by the MAC address, in stage 518. If the determined MAC address, from stage 516, is within the list of MAC addresses assigned to that AP 102, the AP 102 can be assigned that client 104, as a master AP 102a. This information may then be updated in the DHT 310 or the RRM table.

Figure 5C:
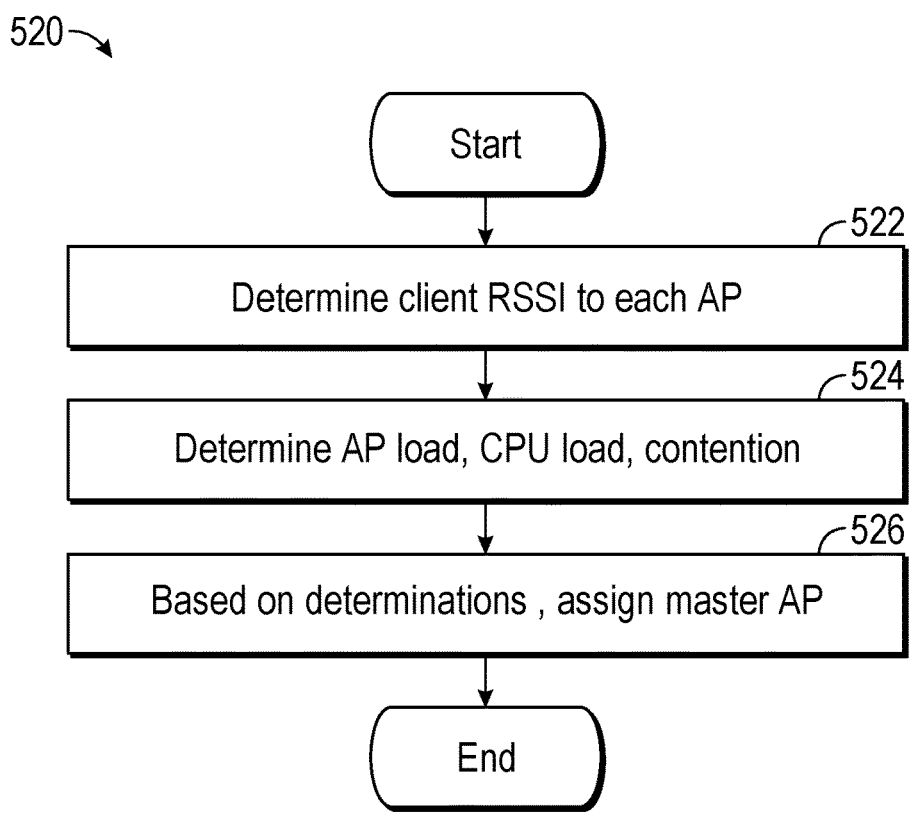
FIG. 5C is another flow chart of a method for determining a master AP in accordance with aspects of the present disclosure.

Referring now to FIG. 520, another method 520 for determining the master AP 102a may be as shown in FIG. 5C. The APs 102 can determine the client's RSSI to each AP 102, in stage 522. Here, the APs 102, within the group 202, can receive probe signals from the client device 104. The RSSI of the signals may be determined for each AP. The RSSI information may then be provided across a service channel to be stored in the RRM table.

Each AP 102 may then determine the signaling load, a CPU load, signal contention, or other types of work processes for each AP 102, in stage 524. The AP 102 can determine how many clients the AP 102 is already servicing, how busy the AP's CPU is, any type of signaling contention at the AP 102, which may be evidence of large number of clients 104 trying to contact AP 102, or other information. This information may also be provided in the service channel or in the RRM table or the DHT.

Based on the determinations above, the APs 102, within the group 202, can assign a master AP 102a. Thus, the AP 102 with the best mix of a strong signal and a lower or lowest load, signal contention, etc., can be designated the master AP 102a for that client 104. Each of the factors above may be given a weight to determine algorithmically which is more important to determine the master AP 102a. Based on the solution of the algorithm, which may be predetermined, the master AP 102a may be selected, and the selection can be stored in the DHT 310.

FIG. 6A shows computing device 600. As shown in FIG. 6A, computing device 600 may include a processing unit 610 and a memory unit 615. Memory unit 615 may include a software module 620 and a database 625. While executing on processing unit 610, software module 620 may perform, for example, processes for determining antenna power output, as described above with respect to FIGS. 1-5C. Computing device 600, for example, may provide an operating environment for the controller, the APs 102, the clients 104, WLC server 106, the connector 108, the locationing service/server 110, and other devices may operate in other environments and are not limited to computing device 600.

Computing device 600 may be implemented using a Wi-Fi access point, a cellular base STA, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Figure 6B:
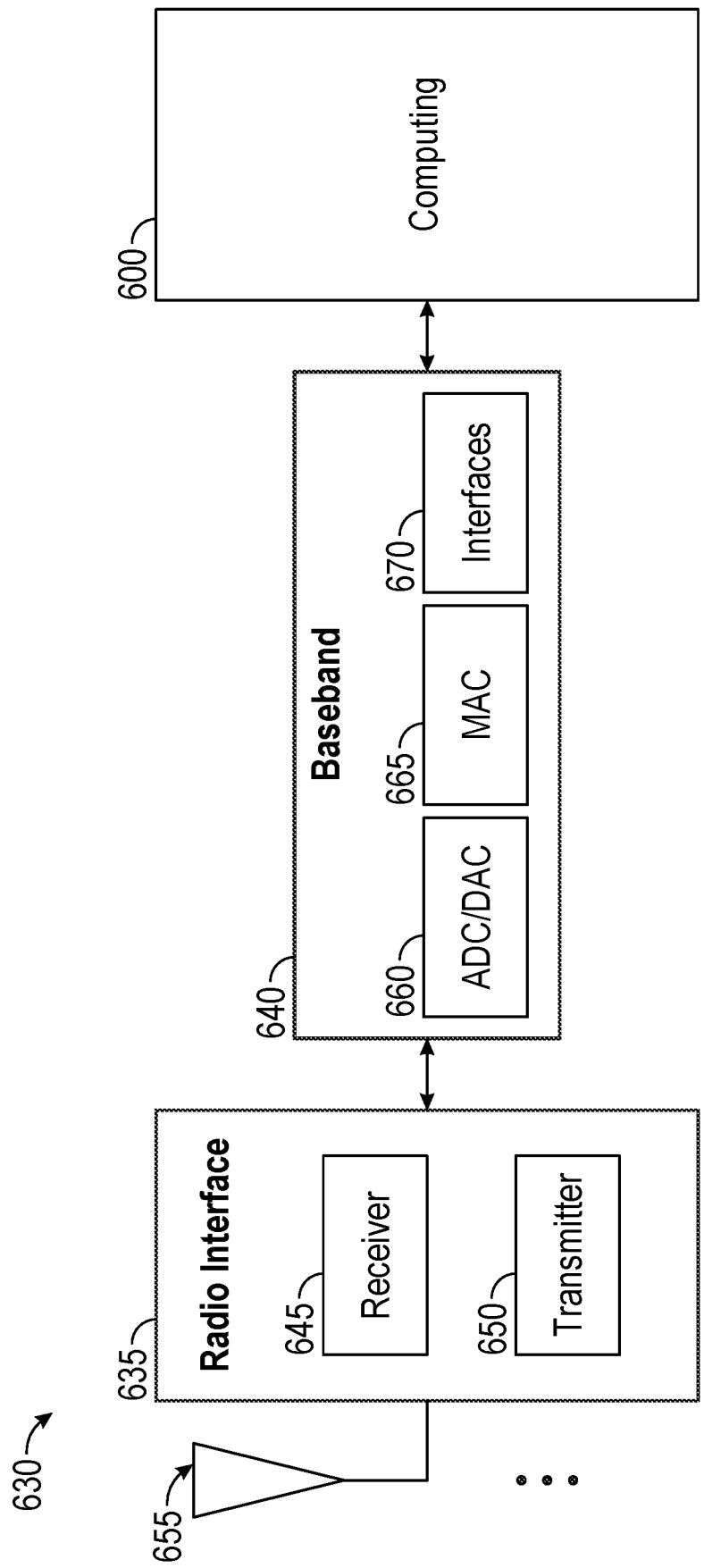
FIG. 6B is a block diagram of a wireless device in accordance with aspects of the present disclosure.

FIG. 6B illustrates an implementation of a communications device 630 that may implement one or more of APs 102, the clients 104, WLC server 106, the connector 108, the locationing service/server 110, etc., of FIGS. 1-5C. In various implementations, device 630 may comprise a logic circuit. The logic circuit may include physical circuits to perform operations described for one or more of APs 102, the clients 104, WLC server 106, the connector 108, the locationing service/server 110, etc., of FIGS. 1-5C, for example. As shown in FIG. 6B, device 630 may include one or more of, but is not limited to, a radio interface 635, baseband circuitry 640, and/or computing platform 600.

The device 630 may implement some or all of the structures and/or operations for APs 102, the clients 104, WLC server 106, the connector 108, the locationing service/server 110, etc., of FIGS. 1-5C, storage medium, and logic circuit in a single computing entity, such as entirely within a single device. Alternatively, the device 630 may distribute portions of the structure and/or operations using a distributed system architecture, such as a client-server architecture, a peer-to-peer architecture, a master-slave architecture, etc.

A radio interface 635, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-error interface or modulation scheme. The radio interface 635 may include, for example, a receiver 645 and/or a transmitter 650. Radio interface 635 may include bias controls, a crystal oscillator, and/or one or more antennas 655. In additional or alternative configurations, the radio interface 635 may use oscillators and/or one or more filters, as desired.

Baseband circuitry 640 may communicate with radio interface 635 to process, receive, and/or transmit signals and may include, for example, an Analog-To-Digital Converter (ADC) for down converting received signals with a Digital-To-Analog Converter (DAC) 660 for up converting signals for transmission. Further, baseband circuitry 640 may include a baseband or PHYsical layer (PHY) processing circuit for the PHY link layer processing of respective receive/transmit signals. Baseband circuitry 640 may include, for example, a Media Access Control (MAC) processing circuit 665 for MAC/data link layer processing. Baseband circuitry 640 may include a memory controller for communicating with MAC processing circuit 665 and/or a computing platform 600, for example, via one or more interfaces 670.

In some configurations, PHY processing circuit may include a frame construction and/or detection module, in combination with additional circuitry such as a buffer memory, to construct and/or deconstruct communication frames. Alternatively or in addition, MAC processing circuit 665 may share processing for certain of these functions or perform these processes independent of PHY processing circuit. In some configurations, MAC and PHY processing may be integrated into a single circuit.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a Random Access Memory (RAM), a Read-Only Memory (ROM), an Erasable Programmable Read-Only Memory (EPROM or Flash memory), an optical fiber, and a portable Compact Disc Read-Only Memory (CD-ROM). Node that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain example of the disclosure have been described, other examples may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device 600 on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A method comprising:
receiving, by a first Access Point (AP), location information associated with a second AP in a location group;
receiving, by the first AP, client location data from the second AP and associated with a first client device wherein the first AP scans a service channel of the second AP to receive the client location data;
determining, by the first AP, a location of the first client device; and
sending, by the first AP, the location of the first client device to a location service.

2. The method of claim 1, further comprising: calculating, by the first AP, a Heat Map from the location information associated with the second AP.

3. The method of claim 1, further comprising: updating a Distributed Hash Table (DHT) that comprises location estimations for two or more client devices being serviced by the location group, wherein the DHT is accessible by at least the first AP and the second AP.

4. The method of claim 3, wherein the first AP is a master AP for the location group and for the first client device, wherein each client device being serviced by the location group is assigned the master AP or another master AP for location determinations.

5. The method of claim 4, further comprising:
determining:
the first client device is associated with the location group;
an association history for the first client device;
a movement history for the first client device; and/or
the first client device is moving; and
based on the determining, selecting the first AP as the master AP for the first client device.

6. The method of claim 4, further comprising:
determining a plurality of Media Access Control (MAC) addresses for client devices being serviced by the location group;
determining a distribution of the plurality of MAC addresses;
providing a subset of the distribution of the plurality of MAC addresses to the first AP; and assigning the first AP as the master AP for the subset of the distribution of the plurality of MAC addresses, wherein the subset includes the first client device.

7. The method of claim 4, further comprising:
determining a Received Signal Strength Indicator (RSSI), to at least the first AP and the second AP, for client devices being serviced by the location group;
determining:
a load on the at least the first AP and the second AP;
a Computer Processing Unit (CPU) load on the at least the first AP and the second AP; and/or
a contention on the at least the first AP and the second AP; and
based on the determining and the RSSI, selecting the first AP as the master AP for the first client device.

8. The method of claim 4, further comprising:
triggering, by the first AP, as the master AP for the first client device, roaming to the second AP in the location group; and
writing, by the first AP, a filter state to the DHT.

9. The method of claim 1, further comprising:
sending the location of the first client device to an arbiter node; and
selecting, by the arbiter node, the location of the location group to provide to the location service.

10. An computing device comprising:
a memory storage; and
a processing unit coupled to the memory storage, wherein the processing unit is operative to:
receive location information associated with a second AP in a location group;
calculate a Heat Map from the location information associated with the second AP;
scan a service channel of the second AP;
receive client location data from the service channel of the second AP and associated with a first client device, wherein the AP is a master AP for the location group for the first client device;
determine a location of the first client device;
update a Distributed Hash Table (DHT) that comprises location estimations for two or more client devices being serviced by the location group, wherein the DHT is accessible by at least the AP and the second AP; and
send the location of the first client device to a location service.

11. The computing device of claim 10, the processing unit is further operative to:
determine:
the first client device is associated with the location group;
an association history for the first client device;
a movement history for the first client device; and/or
the first client device is moving; and
based on the determining, select the AP as the master AP for the first client device.

12. The computing device of claim 10, the processing unit further operative to:
determine a plurality of Media Access Control (MAC) addresses for client devices being serviced by the location group;
determine a distribution of the plurality of MAC addresses;
provide a subset of the distribution of the plurality of MAC addresses to the AP; and
assign the AP, as the master AP, for the subset of the distribution of the plurality of MAC addresses, wherein the subset includes the first client device.

13. The computing device of claim 10, the processing unit is further operative to:
determine a Received Signal Strength Indicator (RSSI), to at least the AP and the second AP, for client devices being serviced by the location group;
determine:
a load on the at least the AP and the second AP;
a Computer Processing Unit (CPU) load on the at least the AP and the second AP; and/or
a contention on the at least the AP and the second AP; and
based on the determining and the RSSI, select the AP as the master AP for the first client device.

14. The computing device of claim 10, the processing unit is further operative to:
trigger, as the master AP for the first client device, roaming to the second AP in the location group; and
write a Kalman filter state to the DHT.

15. A non-transitory computer-readable medium that stores a set of instructions which when executed, by a processor of an Access Point (AP), perform a method executed by the set of instructions comprising:
receiving location information associated with a second AP in a location group;
calculating a Heat Map from the location information associated with the second AP;
scanning a service channel of the second AP;
receiving client location data from the service channel of the second AP and associated with a first client device, wherein the AP is a master AP for the location group for the first client device;
determining a location of the first client device;
updating a Distributed Hash Table (DHT) that comprises location estimations for two or more client devices being serviced by the location group, wherein the DHT is accessible by at least the AP and the second AP; and
sending the location of the first client device to a location service.

16. The non-transitory computer-readable medium of claim 15, the method further comprising:
determining:
the first client device is associated with the location group;
an association history for the first client device;
a movement history for the first client device; and/or
the first client device is moving; and
based on the determining, selecting the AP as the master AP for the first client device.

17. The non-transitory computer-readable medium of claim 15, the method further comprising:
determining a plurality of Media Access Control (MAC) addresses for client devices being serviced by the location group;
determining a distribution of the plurality of MAC addresses;
providing a subset of the distribution of the plurality of MAC addresses to the AP; and
assigning the AP, as the master AP, for the subset of the distribution of the plurality of MAC addresses, wherein the subset includes the first client device.

18. The non-transitory computer-readable medium of claim 15, the method further comprising:
determining a Received Signal Strength Indicator (RSSI), to at least the AP and the second AP, for client devices being serviced by the location group;
determining:
a load on the at least the AP and the second AP;

a Computer Processing Unit (CPU) load on the at least the AP and the second AP; and/or
a contention on the at least the AP and the second AP; and
based on the determining and the RSSI, selecting the AP as the master AP for the first client device.

19. The non-transitory computer-readable medium of claim 15, the method further comprising:
triggering, as the master AP for the first client device, roaming to the second AP in the location group; and
writing a Kalman filter state to the DHT.

* * * * *